May 4, 1965     H. A. THOMAS     3,182,219
MECHANICALLY MODULATED NEUTRON ION CHAMBER
Filed Nov. 21, 1960
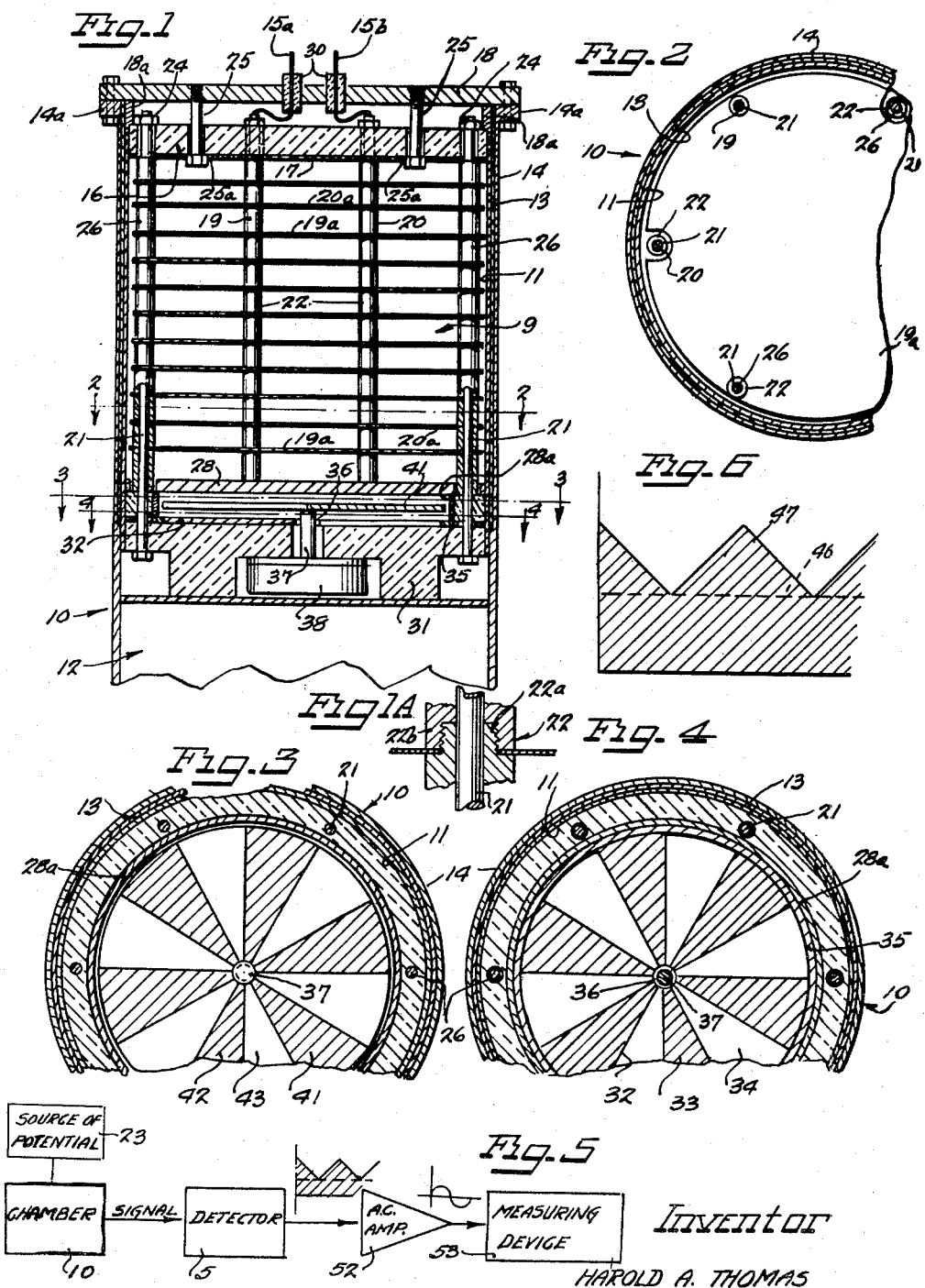
Inventor
HAROLD A. THOMAS
By
Attys United States Patent Office
3,182,219
Patented May 4, 1965

3,182,219
MECHANICALLY MODULATED NEUTRON
ION CHAMBER
Harold A. Thomas, San Diego, Calif., assignor to General
Dynamics Corporation, New York, N.Y., a corporation
of Delaware
Filed Nov. 21, 1960, Ser. No. 70,691
4 Claims. (Cl. 313—61)

This invention relates to ion chambers and more particularly to methods of and apparatus for detecting neutron flux density in a field containing both neutron and gamma radiation.

In neutron radiation detecting operations, it is important to obtain an accurate measurement of neutron flux density particularly when both neutron and gamma radiation emanate from the source being monitored. Numerous devices such as differential ion chambers, compensated ion chambers and the like have been developed to accomplish such measurements. While these devices are designed to yield ion current which is proportional to the number of ionizing particles produced by the neutron radiation, the measurement of this direct current generally requires utilizing either rather complex vibrator-electrometer arrangements or direct current amplifiers which are extremely susceptible to drift and the problems created thereby.

Furthermore, compensation by conventional means which have heretofore been utilized can only reduce the ion current due to gamma radiation by a factor from 20 to 100 and this compensation is quite sensitive to both the magnitude and distribution of the gamma flux.

Manifestly, an ion chamber which is capable of producing an alternating current component that is a representation of neutron radiation density would not require the utilization of complex and costly instrumentalities in conjunction therewith in order to obtain an accurate measurement of the alternating component. Moreover, a conventional A.C. amplifier could be utilized in the detecting and measuring circuitry which is not subject to the usual drift problems associated with D.C. amplifiers.

It is a principal object of this invention to provide an improved ion chamber for detecting neutron flux density in a field containing both neutron and gamma radiation.

Another object of the invention is to provide a neutron ion chamber which generates an alternating current signal that is a direct representation of neutron flux density.

Still another object of the invention is to provide methods of detecting neutron flux emanating from a source of both neutron and gamma radiation.

A more specific object of the invention resides in the provision of a neutron chamber which mechanically modulates neutron radiation entering the chamber so that an alternating signal is produced which is a direct representation of the neutron flux density emanating from a source thereof.

Other objects and advantages of the present invention will become apparent from the following detailed description when considered in conjunction with the accompanying drawing wherein:

FIGURE 1 is a vertical cross-sectional view of an ion chamber embodying certain features of the present invention;

FIGURE 1a is an enlarged fragmentary view illustrating certain assembly features of the chamber illustrated in FIGURE 1;

FIGURE 2 is a fragmentary sectional view taken along the line 2—2 in FIGURE 1;

FIGURE 3 is a fragmentary sectional view taken along the line 3—3 in FIGURE 1;

FIGURE 4 is a fragmentary sectional view taken along the line 4—4 in FIGURE 1;

FIGURE 5 is a diagrammatic representation of a detecting and measuring network which may be utilized in conjunction with the ion chamber illustrated in FIGURE 1; and FIGURE 6 is a graphical representation of a composite alternating signal of the type derived from the ion chamber illustrated in FIGURE 1.

A preferred embodiment of a mechanically modulated ion chamber, which can be utilized to accomplish the measurement of neutron radiation by producing an alternating signal that is a direct representation thereof, may include a gas-filled chamber having a neutron absorbing shield formed about a substantial portion of the outer surface thereof. The remaining unshielded portion may be provided with a segmented surface consisting of neutron absorbing and neutron passing materials. A selectively movable member having a segmented construction corresponding to that of the unshielded portion of the chamber may be situated adjacent thereto. Accordingly upon movement of the member relative to the unshielded portion of the chamber, the neutron radiation entering the chamber may be selectively blocked out and passed while the gamma radiation passes into the chamber without interruption.

The gamma and modulated neutron radiation passing into the chamber bombards radiation-responsive elements positioned therein, and ionization of the gas within the chamber results. Ion current is thereby created which is proportional to the amount of the neutron and gamma radiation entering the chamber. The ion current contains a substantially constant component resulting from ionization effected by the gamma radiation and a component, which varies from a minimum to a maxium value, resulting from ionization effected by the modulated neutron radiation. The varying component of the current, which is a measure of neutron flux density, may readily be detected, amplified and recorded by conventional means that function in conjunction with the chamber.

Referring to the drawing and more particularly to FIGURE 1, a preferred embodiment of an ion chamber incorporating the essential features of the present invention includes a cylindrical housing generally designated by the numeral 10 which is mounted above a conventional experimental chamber 12 or region wherefrom both neutron and gamma radiation emanate. The housing 10 which defines a chamber 9, includes an inner shield 11 of neutron-absorbing material such as cadmium. A cylindrical member 13 of insulating material, e.g., polyethylene, encompasses the cylindrical shield 11 and is in turn encased by and secured to a cylindrical body 14 of non-neutron absorbing material such as aluminum. Mounted at the uppermost portion of the chamber 9 is a disk 16 of suitable insulating material, e.g., polystyrene, which is positioned above a circular plate 17 fabricated of a neutron-absorbing material such as cadmium.

A circular cover 18 is bolted to an annular flange 14a which forms a part of and extends outwardly from the upper extremity of the cylindrical casing or body 14. The cover is provided with a pair of apertures having insulating bushings 30 mounted therein. Conductor members 15a and 15b extend through the bushings 30 and are electrically connected to electrode members 19 and 20, respectively, which extend through apertures provided in the disk 16 and clearance holes in the plate 17.

Each of the electrode members 19 and 20 includes a bolt 21 of conductive material, e.g., aluminum, and a plurality of spacers 22. The spacers 22 are apertured to receive the bolt 21 and each is provided with a male and female threaded fitting 22a and 22b, respectively, at opposite extremities thereof. The electrode members 19 and 20, and more particularly, the spacers 22 serve as support means for a plurality of circular elements or plates 19a and 20a. The plates are fabricated of a material which emits ionizing particles when bombarded by neutron radiation and are supported between the spacers 22 in parallel relation and substantially normal to the path of radiation emanating from the experimental chamber 12.

As illustrated in FIGURE 1a, the plates of radiation-responsive material are provided with circular apertures wherethrough the fitting 22a of a spacer 22 positioned below the plate is threaded into the fitting 22b of a spacer 22 positioned above the plate. This view further illustrates that the plate 19a is in electrical contact with the electrode member 19.

Alternate plates 19a and 20a are mounted between the spacers 22 of the electrode members 19 and 20 in the manner shown in FIGURE 1a. While the plates 19a are maintained in electrical contact with the electrode member 19, each of these plates is provided with a plurality of slots extending inwardly from the outer edge thereof so that the electrode member 20 and other support members for the plates 20a pass freely through the plates 19a without coming in contact therewith. Similarly, the plates 20a, while supported between and maintained in electrical contact with spacers 22 of the electrode member 20 and other support members therefor, are also provided with slots which extend inwardly from the outer edge thereof to allow the electrode member 19 and associated support members for the plate 19a to pass therethrough.

The electrode member 19 serves as a collecting electrode for ion current generated in the shielded chamber, and measuring devices utilized in conjunction with the ion chamber are attached thereto. The electrode member 20 funcitons as a high voltage electrode and supplies a high D.C. potential to the plates 20a. Accordingly, a substantial difference in potential exists between alternate plates 19a and 20a and this "collecting potential" is maintained at constant value during detecting operation by conventional means (not shown).

In a preferred embodiment of the invention the circular plates or elements 19a and 20a are boron coated and enriched with boron–10 isotope, which has a high cross-section for the reaction with neutron radiation. Moreover, the shielded chamber 9 is air-tight and filled with a suitable gas, e.g., nitrogen, which becomes ionized by particles emitted from the plates when bombarded with neutron and gamma radiation from the chamber 12.

A plurality of spacer members 26, each of which includes a bolt 21 and spacers 22, serve as the additional support means for the boron coated plates 19a and 20a. As previously described, alternate ones of the spacer members 26 are maintained in electrical contact with one of the groups of plates (i.e., plates 19a) and extend through the slotted portion of the other group of plates (i.e., plates 20a). The arrangement of the support members and the electrode members relative to the boron coated plates is best illustrated in FIGURE 2.

The structural stability of the chamber is enhanced by providing a plurality of nuts 24 which are threadably secured to the bolts 21 and firmly bear against the upper surface of the disk 16. Additionally, a plurality of bolts 25 are provided which extend through clearance apertures 25a in the plate 17 and apertures in the disk 16 and are threaded within the cover 18. The head of each of the bolts 25 bears against the disk 16 to bring the entire plate assembly into engagement with a cylindrical spacer member 18a that is attached to and extends downwardly from the cover 18. Accordingly, upon removal of the cover or lid the entire plate structure including the shield 11, which is secured to and extends a short distance above the plate 18, will be withdrawn from the chamber 9.

Referring again to FIGURE 1, a shield plate 28 is mounted at the lowermost extremity of the gas filled chamber. The plate 28, which is preferably fabricated of material such as lead that serves to reduce soft gamma ray modulation, is provided with suitably proportioned clearance apertures wherethrough the bolts 21 of the members 19, 20 and 26 extend. The head of each of the bolts 21 engages and the bolts pass through a motor mounting 31 that is positioned at the base of the chamber below the plate 28. Interposed between the motor mounting and the plate 28 is a stationary modulating plate or member 32, which is provided with a plurality of clearance apertures wherethrough the bolts 21 pass.

The modulating plate or member 32 is secured at the lower extremity of the chamber 9 in spaced relation to the shield plate 28. A cylindrical foil shield or member 28a, which is preferably made of a material such as aluminum, is vertically disposed between the shield plate 28 and the modulating plate or member 32. The cylindrical foil member 28a shields the collecting electrode 19 from a rotatable disk or plate 41, the function of which will be hereinafter described. More specifically, the shield serves to preclude electrical noise which might be picked up by the electrode 19 when rotary motion is imparted to the disk.

As illustrated in FIGURE 4, the plate 32 is fabricated of alternately spaced segments 33 and 34 of materials having substantially different radiation responsive characteristics. An annular ring 35 having characteristics corresponding to the spaced segments 33 is provided about the outer periphery of the plate 32. The segments 33 and the annular ring 35 are fabricated of neutron-absorbing material, while the segments 34 are constructed of a material having neutron-passing characteristics.

In the illustrated embodiment of the invention the central portion of the segmented plate 32 is provided with an aperture 36 wherein a drive shaft 37 of a motor 38 (FIGURE 1) is mounted for rotary movement relative thereto. The motor 38 is secured within the motor mounting 31 and is provided with power from a conventional alternating current source (not shown). The drive shaft 37 of the motor 38 is secured to the rotary segmented plate 41, which is mounted for rotary movement relative to the plate 32.

The plate 41 consists of a segmented arrangement of elements similar to that provided in the plate 32. However, no annular ring is provided about the periphery of this plate. The diameter of the plate 41 is slightly larger than the inner diameter of the plate 32 as measured from the inner surface of the annular ring 35. Alternate segments 42 and 43 of the plate 32 are similarly fabricated of neutron absorbing and neutron passing materials. In the preferred embodiment of the invention these neutron absorbing and neutron passing materials are cadmium and aluminum, respectively. However, other suitable materials having similar radiation responsive characteristics could also be used.

The construction of the stationary plate 32 and the rotary plate 41 is such that when dissimilar segments of the two plates are aligned, no neutron radiation will pass into the chamber. Leakage of neutron flux around the edge of the rotary plate 41 is precluded since the annular ring of the plate 32 extends below and beneath this edge. Alternately, when similar segments of the two plates are aligned, a maximum amount of neutron radiation will pass into the chamber. As the rotary plate 41 is advanced relative to the stationary plate 32, the amount of neutron radiation passing into the chamber will vary proportionately.

*Mode of operation*

A detecting operation is initiated when suitable measuring instruments are connected to the collecting electrode 19 and a direct current potential (i.e., 500 volts) is applied to the high voltage electrode 21 from a source 23. The potential established between the electrode members 19 and 20 also exists between alternate boron coated plates 19a and 20a.

Subsequent to the establishment of a potential between the plates 19a and 20a, the motor 38 is rendered effective, thereby causing the segmented plate 41 to rotate relative to the stationary plate 32. Accordingly, as the plate 41 rotates alternate cadmium segments thereof are periodically aligned with the cadmium segments of the stationary plate 32 and neutron radiation emanating from the chamber 12 passes freely into the shielded chamber.

During those intervals of rotation when the neutron absorbing segments 42 of the plate 41 are fully aligned with the neutron passing segments 34 of the plate 32 substantially no neutron radiation enters the chamber. As the position of the cadmium and aluminum segments of the plates 41 and 32 varies from full alignment to full misalignment, the amount of neutron radiation entering the ionization chamber uniformly fluctuates between a minimum and a maximum value. Although the amount of neutron radiation entering the chamber is modulated in the aforementioned manner, the gamma radiation emanating from the source 12 and entering the shielded chamber 10 remains substantially constant and is unaffected by the rotation of the segmented plate 41 relative to the stationary plate 32.

The gamma radiation and modulated neutron radiation entering the gas-filled chamber bombard the boron coated plates 19a and 20a. The bombardment of these plates results in the emission of ionizing particles and the ionization of the nitrogen gas that fills the regions between adjacent plates. Accordingly, a plurality of ion pairs are formed and ion current is produced which is a direct measure of the amount of ionizing radiation entering the chamber. Under the influence of the electric field established between the various pairs of plates 19a and 20a the positive ions move toward the plates 19a and the negative ions move toward the plates 20a. As illustrated in FIGURE 6, the resulting ion current flow between the plates contains a constant component 46 corresponding to the gamma radiation and a variable component 47 which represents the mechanically modulated neutron radiation.

The alternating frequency of the variable component of the ion current, which corresponds to the modulated neutron radiation, is a function of the speed at which the motor 38 drives the plate 41 and of the number of segments provided by the plates 32 and 41. In the illustrated embodiment, a frequency of 120 c.p.s. is conveniently established by choosing a motor 38 which drives the plate 41 at a speed of 120 r.p.m. and by selecting segmented plates 32 and 41 consisting of 12 alternately spaced segments of neutron absorbing and neutron passing materials.

FIGURE 5 diagrammatically illustrates a preferred system for separating the alternating ion current component from the steady gamma ray component. This system includes a detecting network 51, a narrow band alternating current amplifier 52 which passes only the fundamental frequency, and a conventional measuring device 53.

It should be understood that the above described embodiment is simply illustrative of the application of the invention. Numerous other arrangements of the structural features described may be readily devised by those skilled in the art which would embody the principles of the invention and fall within the spirit and scope thereof. For example, the chamber might be mounted so that gamma and neutron radiation enters from one side thereof. Accordingly, rather than a segmented plate arrangement at the lower extremity thereof, segmented concentric cylinders, one of which is rotatable, could be utilized to modulate the neutron flux passing into the chamber. This is but one modification which would be readily apparent to the skilled artisan. Numerous other modifications could be devised without departing from the inventive concept defined in the following claims.

What is claimed is:

1. Apparatus for selectively detecting neutron flux emanating from a source of neutron and gamma radiation, which comprises a chamber mounted adjacent the source of radiation, one portion of said chamber facing said source and having a plurality of spaced segments formed therein for passing neutron radiation therethrough; a member mounted adjacent said segmented portion for movement relative thereto, said member having a plurality of neutron radiation passing segments formed therein in spaced relation to each other; means for imparting movement to said member to alternately advance said neutron radiation passing segments of said member into and out of alignment with the neutron radiation passing segments of said portion so that the density of the neutron flux passing from said source into said chamber varies uniformly from zero to a maximum value; and means mounted within said chamber for producing an ionization current variable in accordance with variations in the density of the neutron flux entering said chamber.

2. An ion chamber which comprises a cylindrical housing mounted adjacent a source of radiation, one portion of said cylindrical housing facing said source of radiation and being provided with segments for passing neutron radiation therethrough alternately spaced between segments for absorbing neutron radiation; a member mounted adjacent said segmented portion of said housing for movement relative thereto, said member having segments for passing neutron radiation alternately spaced between neutron radiation absorbing segments; means for imparting movement to said member relative to said housing to cyclically advance corresponding neutron radiation passing and absorbing segments of said portion and said member into and out of alignment so that the amount of neutron flux passing into said housing uniformly fluctuates between a minimum and a maximum value; and means mounted within said housing for producing an ionization current variable in accordance with the variation in the amount of neutron flux entering said housing.

3. Apparatus for detecting neutron radiation emanating from a source thereof, which comprises a generally cylindrical gas-filled chamber, said gas-filled chamber having one end portion thereof mounted adjacent the source and having a cadmium coating on the remaining inner portion thereof, first and second electrode members mounted within said chamber, means for establishing a potential between said electrode members, a first plate having a radiation-responsive coating mounted within said chamber in parallel relation to said end portion adjacent the source of neutron flux, said first plate being connected to said first electrode member and insulated from said second electrode member, a second plate having a radiation-responsive coating and mounted within said chamber in parallel relation to said first plate, said second plate being secured to said second electrode and insulated from said first electrode, a first segmented member stationarily mounted on said end portion of said chamber between the source of neutron flux and said first plate, a second segmented member rotatably mounted adjacent said first segmented member in parallel relation thereto, said first and second segmented members being provided with alternate segments that are respectively neutron flux-absorbing and neutron flux-passing, and means for rotating said second segmented member relative to said first segmented member to vary the amount of neutron flux passing through said segmented members into said chamber.

4. Apparatus for producing an alternating signal proportional to the density of neutron flux emanating from a source of neutron and gamma radiation, which comprises a cylindrical nitrogen-filled chamber having an extremity thereof mounted adjacent the source, first and second electrode members mounted within said chamber, means for establishing a potential between said electrode members, a plurality of spaced circular elements mounted within said chamber in parallel relation to said extremity thereof and normal to the longitudinal axis thereof, alternate ones of said plates being secured to a respective one of said electrode members so that a potential is established between adjacent plates, each of said plates being coated with a radiation-responsive material so that ionization of the nitrogen within said chamber is effected by the bombardment of said plates by neutron radiation passing through said extremity of said chamber, an end plate stationarily mounted on said extremity of said chamber adjacent the source of radiation, said end plate having at least one portion thereof formed of neutron radiation absorbing material and at least one portion transmissive of neutron radiation, a circular member rotatably mounted adjacent said end plate in parallel relation thereto and having at least one portion thereof formed of neutron radiation absorbing material and at least one portion transmissive of neutron radiation, and means for advancing said circular member relative to said end plate to bring the neutron absorbing portions of said member and said end plate into and out of alignment so that the neutron radiation passing from said source into said chamber fluctuates between a minimum and a maximum value and the ionization of the nitrogen within said chamber produces an ion current which varies directly in proportion thereto.

References Cited by the Examiner

UNITED STATES PATENTS

| 2,795,704 | 6/57 | Bryant et al. | 250—83.1 |
| 2,824,971 | 2/58 | Weeks | 313—61 |
| 2,929,932 | 3/60 | Bouricius et al. | 313—61 |
| 2,944,150 | 7/60 | Replogle et al. | 313—61 |
| 2,950,393 | 8/60 | Southward | 313—61 |
| 2,951,942 | 9/60 | Kramish | 313—61 |

FOREIGN PATENTS 821,188   9/59   Great Britain.

OTHER REFERENCES

Article by Wiegand, "High Energy Neutron Detector," United States Atomic Energy Commission, AECD–2168 (5 pages; drawing on page 3 relied on).

GEORGE N. WESTBY, *Primary Examiner.*

ARTHUR GAUSS, *Examiner.*